(12) United States Patent  
Carpenter

(10) Patent No.: US 8,828,284 B2
(45) Date of Patent: Sep. 9, 2014

(54) METHOD OF PRODUCING AN OPTICAL ELEMENT HAVING A MARK

(71) Applicant: Transitions Optical, Inc., Pinellas Park, FL (US)

(72) Inventor: William D. Carpenter, Clearwater, FL (US)

(73) Assignee: Transitions Optical, Inc., Pinellas Park, FL (US)

( * ) Notice: Subject to any disclaimer, the term of this patent is extended or adjusted under 35 U.S.C. 154(b) by 0 days.

(21) Appl. No.: 13/741,423

(22) Filed: Jan. 15, 2013

(65) Prior Publication Data

US 2014/0199521 A1  Jul. 17, 2014

Related U.S. Application Data

(60) Provisional application No. 61/589,472, filed on Jan. 23, 2012.

(51) Int. Cl.
| | |
|---|---|
| *B23K 26/36* | (2014.01) |
| *G02B 1/12* | (2006.01) |
| *B29D 11/00* | (2006.01) |
| *G02C 7/02* | (2006.01) |

(52) U.S. Cl.
CPC ............ *G02B 1/12* (2013.01); *B29D 11/00326* (2013.01); *B23K 26/36* (2013.01); *G02C 7/021* (2013.01)
USPC ... 264/1.37; 264/1.7; 351/159.69; 428/315.5; 219/121.69

(58) Field of Classification Search
CPC ... B23K 26/36; G02C 7/021; B29D 11/00326
USPC .................. 264/1.37, 1.7, 400, 482; 428/163, 428/304.4, 314.2, 315.5; 219/121.69; 351/159.69; 359/642, 896
See application file for complete search history.

(56) References Cited

U.S. PATENT DOCUMENTS

| | | | |
|---|---|---|---|
| 5,467,149 A | 11/1995 | Morrison et al. | |
| 6,126,285 A | 10/2000 | Oyama et al. | |
| 6,373,571 B1 * | 4/2002 | Juhasz et al. .................. | 356/399 |
| 2002/0003605 A1 | 1/2002 | Rogers et al. | |
| 2007/0262061 A1 | 11/2007 | Agmon et al. | |

FOREIGN PATENT DOCUMENTS

JP           2009139918 A        6/2009

\* cited by examiner

*Primary Examiner* — Samuel M Heinrich
(74) *Attorney, Agent, or Firm* — The Webb Law Firm

(57) ABSTRACT

The present invention relates to a method of forming an optical element that includes a mark. The method involves, irradiating at least a portion of a surface of the optical element with laser radiation, thereby forming a plurality of substantially parallel elongated grooves in the portion of the surface, which are each aligned substantially parallel with a common longitudinal direction that extends from a center point of the plurality of elongated grooves. The plurality of elongated grooves together define the mark. A clear film is formed over at least the portion of the surface and the plurality of elongated grooves. Depending on the orientation of a source of electromagnetic radiation as viewed through the optical element relative to the common longitudinal direction of the grooves, the mark is either observable or unobservable. The present invention also relates to an optical element having a mark, as described above.

22 Claims, 5 Drawing Sheets

METHOD OF PRODUCING AN OPTICAL ELEMENT HAVING A MARK

CROSS REFERENCE TO RELATED PATENT APPLICATION

The present application is entitled to and claims priority to U.S. Provisional Patent Application No. 61/589,472 filed on Jan. 23, 2012, which is incorporated herein by reference in its entirety.

FIELD

The present invention relates to a method of producing an optical element, such as an ophthalmic lens, having a mark in a surface thereof, that involves forming a plurality of parallel and commonly aligned elongated grooves in the surface of the optical element, in which the plurality of elongated grooves define the mark, and forming a clear film over the plurality of grooves. The present invention also relates to an optical element having such a mark.

BACKGROUND

With optical elements, such as ophthalmic lenses, one or more marks are often applied to or introduced into a surface of the optical element. Such marks can be used for purposes of, for example, identifying the manufacturer of the optical element, identifying a particular production run that resulted in formation of the optical element, and/or providing information about the optical element, such as optical characteristics (e.g., optical axes, centering points, etc.), the refractive index of the material from which the optical element was fabricated, and/or coatings residing on the optical element, such as anti-reflective and/or scratch-resistant coatings. Such marks are typically unobservable when the optical element is in normal use, such as being unobservable by a person wearing a pair of ophthalmic lenses having such a mark. The marks can be rendered observable under certain limited circumstances, such as exposure to a particular wavelength of light or applied vapor, so as to determine the information contained in the mark. Typically, the marks are of relatively small dimensions. It is often desirable that the mark be a permanent mark, so the information provided thereby can be accessed more than once and/or at a time that is remote from formation of the mark.

A method of introducing a mark into an optical element includes, for example, physically engraving a surface of the optical element, such as with a stylus. Chemical leeching can be used to introduce a mark, such as with optical elements fabricated from silica based glass. Lasers can also be used to introduce a mark into the surface of or within the body of an optical element. Present methods of introducing a mark into an optical element can result in the formation of marks that are undesirably observable, under some conditions, when the optical element is in normal use. For example, progressive ophthalmic lenses typically include one or more marks that can be used by an optician to properly and accurately fit the lenses on a person for whom the lenses have been prepared. Such marks can, in some instances, be visually observable to a wearer of the lenses, appearing, for example, as a small area of optical distortion in one or both of the lenses.

It would be desirable to develop new methods of producing optical elements having one or more marks. It would be further desirable that such newly developed methods result in the formation of marks that are substantially unobservable during normal use, and which can be rendered observable under reasonably controllable conditions.

SUMMARY OF THE INVENTION

In accordance with the present invention, there is provided method of producing an optical element having a mark comprising, (a) irradiating at least a portion of a surface of the optical element with laser radiation, thereby forming a plurality of elongated grooves in the portion of the surface. Each elongated groove has a longitudinal axis, each elongated groove is substantially parallel to an adjacent elongated groove, the longitudinal axis of each elongated groove is aligned substantially parallel with a common longitudinal direction, and the plurality of elongated grooves together define the mark. The plurality of elongated grooves has a center point, and the common longitudinal direction extends from, or is aligned with, the center point of the plurality of elongated grooves. The method of the present invention further comprises, (b) forming a clear film over at least said portion of the surface and the plurality of elongated grooves.

In accordance with the method of the present invention, the resulting mark is substantially unobservable when a source of electromagnetic energy is viewed through the optical element at a first position that has a first alignment, with the center point of the plurality of elongated grooves, that is substantially parallel to the common longitudinal direction. In addition, the mark is substantially observable when the source of electromagnetic energy is viewed through the optical element at a second position that has a second alignment, with the center point of the plurality of elongated grooves, that is substantially orthogonal to the common longitudinal direction.

In further accordance with the present invention, there is provided an optical element comprising: (a) a mark residing in a surface of the optical element, in which the mark is defined by a plurality of elongated grooves as described above; and (b) a clear film residing over the plurality of grooves. The mark of the optical element is unobservable and observable under the different orientations with regard to exposure to electromagnetic energy as described above.

BRIEF DESCRIPTION OF THE DRAWINGS

In FIG's 1 through 8 the same characters represent the same components unless otherwise indicated.

DETAILED DESCRIPTION

Figure 1:
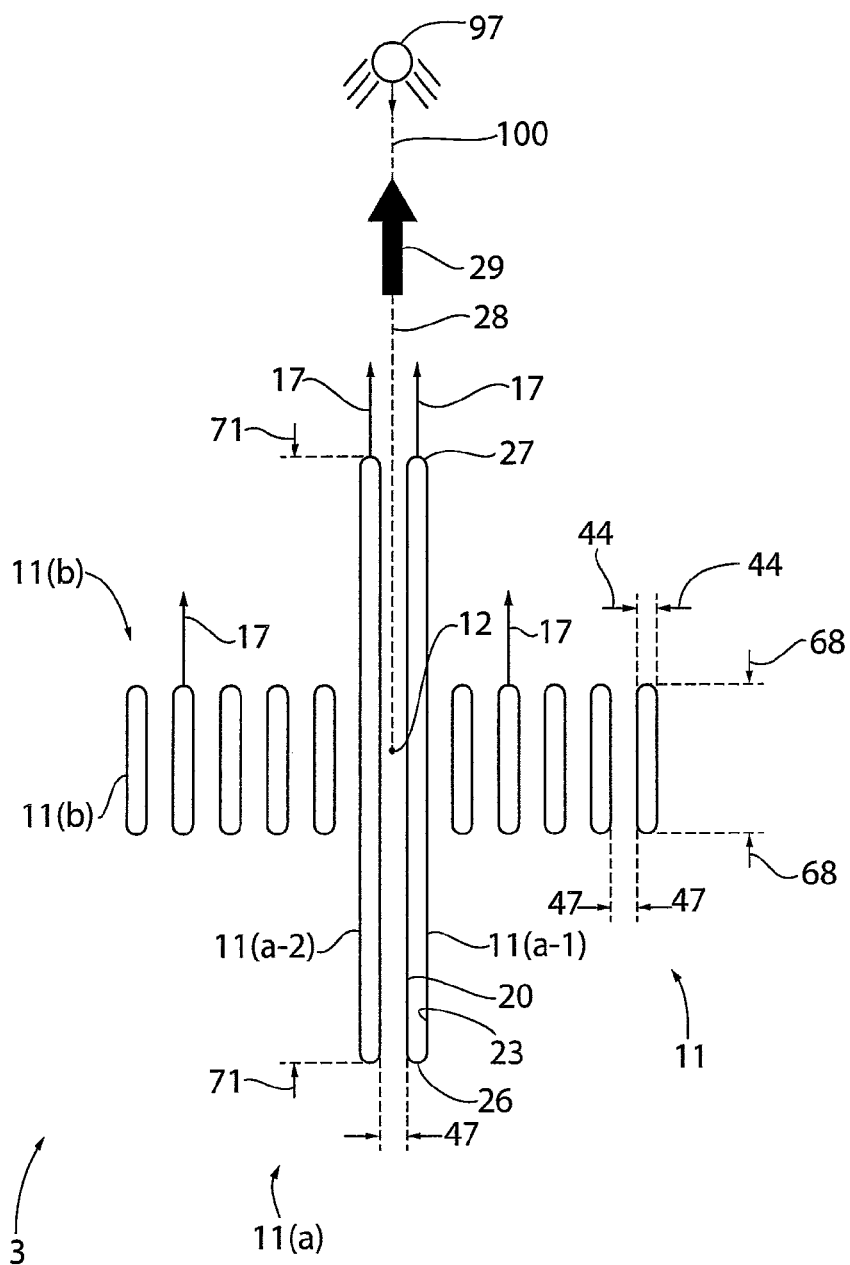
FIG. 1 is a representative top plan view of a plurality of grooves that define a mark prepared in accordance with the method of the present invention, and in which a source of electromagnetic radiation is represented as being viewed through the optical element at a first position that is substantially parallel to the common longitudinal direction of the plurality of grooves.

As used herein the term "optical" means pertaining to or associated with light and/or vision. For example, according to various non-limiting embodiments disclosed herein, the optical element, article or device can be chosen from ophthalmic elements, articles, and devices, display elements, articles, and devices, windows, mirrors, and active and passive liquid crystal cell elements, articles and devices.

As used herein the term "ophthalmic" means pertaining to or associated with the eye and vision. Non-limiting examples of ophthalmic articles or elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

As used herein the term "ophthalmic substrate" means lenses, partially formed lenses, and lens blanks.

As used herein the term "display" means the visible or machine-readable representation of information in words, numbers, symbols, designs or drawings. Non-limiting examples of display elements, articles and devices include screens, and monitors.

As used herein the term "window" means an aperture adapted to permit the transmission of radiation therethrough. Non-limiting examples of windows include automotive and aircraft transparencies, filters, shutters, and optical switches.

As used herein the term "mirror" means a surface that specularly reflects a large or substantial fraction of incident light.

As used herein the term "liquid crystal cell" refers to a structure containing a liquid crystal material that is capable of being ordered. Active liquid crystal cells are cells in which the liquid crystal material is capable of being reversibly and controllably switched or converted between ordered and disordered states, or between two ordered states by the application of an external force, such as electric or magnetic fields. Passive liquid crystal cells are cells in which the liquid crystal material maintains an ordered state. A non-limiting example of an active liquid crystal cell element or device is a liquid crystal display.

As used herein the term "coating" means a supported film derived from a flowable composition, which may or may not have a uniform thickness, and specifically excludes polymeric sheets.

As used herein the term "sheet" means a pre-formed film having a generally uniform thickness and capable of self-support.

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester" means methacrylates and/or acrylates. As used herein, the term "(meth)acrylic acid" means methacrylic acid and/or acrylic acid.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein, the articles "a," "an," and "the" include plural referents unless otherwise expressly and unequivocally limited to one referent.

As used herein, the term "a mark" means one or more marks.

As used herein, the term "photochromic" and similar terms, such as "photochromic compound" means having an absorption spectrum for at least visible radiation that varies in response to absorption of at least actinic radiation. Further, as used herein the term "photochromic material" means any substance that is adapted to display photochromic properties (i.e. adapted to have an absorption spectrum for at least visible radiation that varies in response to absorption of at least actinic radiation) and which includes at least one photochromic compound.

As used herein, the term "photochromic compound" includes thermally reversible photochromic compounds and non-thermally reversible photochromic compounds. The term "thermally reversible photochromic compounds/materials" as used herein means compounds/materials capable of converting from a first state, for example a "clear state," to a second state, for example a "colored state," in response to actinic radiation, and reverting back to the first state in response to thermal energy. The term "non-thermally reversible photochromic compounds/materials" as used herein means compounds/materials capable of converting from a first state, for example a "clear state," to a second state, for example a "colored state," in response to actinic radiation, and reverting back to the first state in response to actinic radiation of substantially the same wavelength(s) as the absorption(s) of the colored state (e.g., discontinuing exposure to such actinic radiation).

As used herein the term "dichroic" means capable of absorbing one of two orthogonal plane polarized components of at least transmitted radiation more strongly than the other.

As used herein, the term "photochromic-dichroic" and similar terms, such as "photochromic-dichroic materials" and "photochromic-dichroic compounds" means materials and compounds that possess and/or provide both photochromic properties (i.e., having an absorption spectrum for at least visible radiation that varies in response to at least actinic radiation), and dichroic properties (i.e., capable of absorbing one of two orthogonal plane polarized components of at least transmitted radiation more strongly than the other).

As used herein to modify the term "state," the terms "first" and "second" are not intended to refer to any particular order or chronology, but instead refer to two different conditions or properties. For purposes of non-limiting illustration, the first state and the second state of a photochromic-dichroic compound of a photochromic-dichroic layer can differ with respect to at least one optical property, such as but not limited to the absorption or linearly polarization of visible and/or UV radiation. Thus, according to various non-limiting embodiments disclosed herein, the photochromic-dichroic compound of a photochromic-dichroic layer can have a different absorption spectrum in each of the first and second state. For example, while not limiting herein, the photochromic-dichroic compound of a photochromic-dichroic layer can be clear in the first state and colored in the second state. Alternatively, the photochromic-dichroic compound of a photochromic-dichroic layer can have a first color in the first state and a second color in the second state. Further, the photochromic-dichroic compound of a photochromic-dichroic layer can be non-linearly polarizing (or "non-polarizing") in the first state, and linearly polarizing in the second state.

As used herein, the term "photosensitive material" means materials that physically or chemically respond to electromagnetic radiation, including, but not limited to, phosphorescent materials and fluorescent materials.

As used herein, the term "non-photosensitive materials" means materials that do not physically or chemically respond to electromagnetic radiation, including, but not limited to, static dyes.

Other than in the operating examples, or where otherwise indicated, all numbers expressing quantities of ingredients, reaction conditions, and so forth used in the specification and claims are to be under stood as modified in all instances by the term "about."

As used herein, spatial or directional terms, such as "left", "right", "inner", "outer", "above", "below", and the like, relate to the invention as it is depicted in the drawing figures. However, it is to be understood that the invention can assume various alternative orientations and, accordingly, such terms are not to be considered as limiting.

As used herein, the terms "formed over," "deposited over," "provided over," "applied over," residing over," or "positioned over," mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

All documents, such as but not limited to issued patents and patent applications, referred to herein, and unless otherwise indicated, are to be considered to be "incorporated by reference" in their entirety.

The method of the present invention involves irradiating at least a portion of a surface of an optical element with laser radiation, which results in the formation of a plurality of elongated grooves in that portion of the surface. With reference to FIG. 1, and for purposes of non-limiting illustration, there is depicted a plurality of elongated grooves 11 that together define a mark 3. Mark 3 has a cruciform shape. As depicted in FIG. 1, the plurality of elongated grooves 11 are composed of a plurality of elongated grooves 11(a) having a longer length, and a plurality of elongated grooves 11(b) having a shorter length relative to elongated grooves 11(a). Each elongated groove 11 has a longitudinal axis 17.

With the elongated grooves prepared in accordance with the method of the present invention, each elongated groove 11 is substantially parallel to an adjacent elongated groove 11. For purposes of non-limiting illustration, and with further reference to FIG. 1, elongated groove 11(a-1) is substantially parallel to adjacent elongated groove 11(a-2), and correspondingly elongated groove 11(a-2) is substantially parallel to adjacent elongated groove 11(a-1). Each elongated groove 11(b) is substantially parallel to each adjacent elongated groove 11(b). In addition, elongated groove 11(a-1) is substantially parallel to an adjacent elongated groove 11(b), and visa versa. Further additionally, elongated groove 11(a-2) is substantially parallel to an adjacent elongated groove 11(b), and visa versa.

In accordance with some embodiments, each elongated groove is substantially parallel with each other elongated groove of the plurality of elongated grooves.

As used herein, the term "substantially parallel" means a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

The longitudinal axis of each elongated groove is aligned substantially parallel with a common longitudinal direction. With reference to FIG. 1, and for purposes of non-limiting illustration, the longitudinal axis 17 of each elongated groove 11, of the plurality of elongated grooves 11, is aligned substantially parallel with a common longitudinal direction indicated by arrow 29. The common longitudinal direction 29, with some embodiments, extends from, or is aligned with, a center point 12 of the plurality of elongated grooves 11, as indicated by dashed line 28. The center point of the plurality of elongated grooves is, with some embodiments, a geometric center point, which can be determined in accordance with art-recognized methods. When, as with some embodiments, the plurality of elongated grooves reside in a common plane, the center point also resides in the common plane.

The plurality of elongated grooves, with some embodiments, are free of two or more intersecting elongated grooves. Correspondingly and in accordance with some embodiments, each elongated groove is free of intersection with any other elongated groove of the plurality of elongated grooves.

Each elongated groove of the plurality of elongated grooves is, in accordance with some embodiments, a substantially straight elongated groove. Straight elongated grooves, in accordance with the present invention, are substantially free of bends, including curves and sharp or angled bends. With some further embodiments, each elongated groove is a substantially straight elongated groove, which is defined by elongated walls that are substantially parallel to each other. For purposes of illustration, and with reference to FIG. 1, elongated groove 11(a-1) has, and is defined in part by, a first elongated sidewall 20 and a second elongated sidewall 23, which are substantially parallel to each other. Each elongated sidewall of an elongated groove is, with some embodiments, substantially straight.

In accordance with some further embodiments, each elongated groove, of the plurality of elongated grooves, is free of intersection with itself.

The plurality of elongated grooves, in accordance with additional further embodiments, reside in a common plane.

The elongated grooves of the plurality of elongated grooves, in accordance with some embodiments, have a first terminal end and a second terminal end. Independently for each elongated groove, the first terminal end and the second terminal can each independently be defined by a wall having a shape selected from polygonal shapes, arcuate shapes, irregular shapes, and combinations thereof. Examples of polygonal shapes include, but are not limited to triangles, rectangles, squares, pentagons, hexagons, heptagons, octagons, portions thereof, such as a V-shape, and combinations thereof. Examples of arcuate shapes include, but are not limited to, spherical shapes, oval shapes, portions thereof, and combinations thereof. For purposes of further non-limiting illustration, examples of a combination of a polygonal shape and an arcuate shape include U-shapes.

With some non-limiting embodiments, for at least one elongated groove, the first terminal end and the second terminal end are each independently defined by an arcuate wall. With reference to FIG. 1, and for purposes of non-limiting illustration, elongated groove 11(a-1) has a first terminal end 26 and a second terminal end 27 that are each defined by an arcuate wall.

The elongated grooves prepared in accordance with the present invention can, with some embodiments, have cross-sectional shapes selected from polygonal shapes, arcuate shapes, irregular shapes, and combinations thereof. Non-limiting examples of polygonal and arcuate shapes include, but are not limited to, those described previously herein with regard to the first and second terminal ends of the elongated grooves. In accordance with some embodiments, at least one elongated groove of the plurality of elongated grooves has a V-shape.

The dimensions of each elongated groove, including the depth, width, and length thereof, are in each case independently selected such that the mark, which is defined by the plurality of elongated grooves, is: (i) substantially unobservable when a source of electromagnetic energy is viewed through the optical element at a first position that has a first alignment with the center point (of the plurality of elongated grooves) that is substantially parallel to the common longitudinal direction; and (ii) substantially observable when the source of electromagnetic energy is viewed through the optical element at a second position that has a second alignment with the center point that is substantially orthogonal to the common longitudinal direction, as will be described in further detail herein.

The dimensions of the elongated grooves can be determined in accordance with art-recognized methods. A confocal laser scanning microscope is used with some embodiments to determine the dimensions of the elongated grooves.

Figure 3:
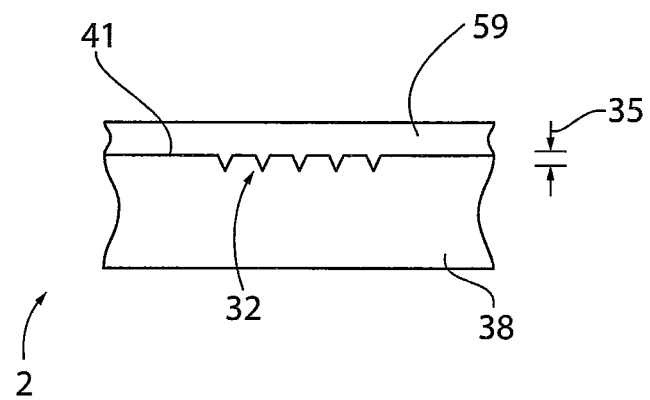
FIG. 3 is a representative sectional view of an optical element prepared in accordance with the method of the present invention, in which a plurality of grooves are formed in the optical substrate thereof.

In accordance with some embodiments, each elongated groove independently has a depth of from 0.1 micrometers to 2 micrometers, or from 0.2 micrometers to 1.8 micrometers, or from 0.3 micrometers to 1.5 micrometers, inclusive of the recited values. With reference to FIG. 3, and for purposes of non-limiting illustration, elongated grooves 32 have a depth 35 relative to exterior surface 41 of optical substrate 38. With some embodiments, each elongated groove has a depth of from 1 to 1.5 micrometers, such as 1.4 micrometers.

The width of each elongated groove, with some embodiments, is from 10 micrometers to 60 micrometers, or from 15 micrometers to 55 micrometers, or from 20 micrometers to 50 micrometers, inclusive of the recited values. With reference to FIG. 1, and for purposes of non-limiting illustration, elongated grooves 11 have a width 44. With some embodiments, each elongated groove has a width of from 30 micrometers to 50 micrometers, such as 40 micrometers.

The separation distance between each pair of elongated grooves can be independently selected so as to adjust the intensity of the mark, or one or more portions of the mark, when a source of electromagnetic energy is viewed through the optical element at a second position that has a second alignment with the center point that is substantially orthogonal to the common longitudinal direction. When the separation distance between at least some pairs of elongated grooves is reduced, the density of elongated grooves per unit area increases, and correspondingly the intensity of the mark, or one or more portions of the mark corresponding to the increased density of elongated grooves, is increased, when the plurality of elongated grooves are positioned so as to be observable. When the separation distance between at least some pairs of elongated grooves is increased, the density of elongated grooves per unit area decreases, and correspondingly the intensity of the mark, or one or more portions of the mark corresponding to the decreased density of elongated grooves, is decreased, when the plurality of elongated grooves are positioned so as to be observable.

In accordance with some embodiments, each pair of elongated grooves independently has a separation distance therebetween of from 2 micrometers to 180 micrometers, or from 10 micrometers to 100 micrometers, or from 15 micrometers to 80 micrometers, or from 20 micrometers to 60 micrometers, or from 30 to 50 micrometers, inclusive of the recited values. With reference to FIG. 1, and for purposes of non-limiting illustration, pair of elongated grooves 11(a-1) and 11(a-2) have a separation distance 47 therebetween. With some embodiments, each pair of elongated grooves has a separation distance therebetween of from 35 to 45 micrometers, such as 40 micrometers.

The length of each elongated groove can be independently selected from a wide range of values, provided that the length of each elongated groove is greater than the width thereof. With some embodiments, the ratio between the length and width of each elongated groove can independently range from 1.1:1 to 100:1, or from 2:1 to 80:1, or from 3:1 to 50:1, inclusive of the recited values. The length of each elongated groove can, in accordance with some embodiments, range from 11 micrometers to 6000 micrometers, or from 20 micrometers to 1000 micrometers, or from 30 micrometers to 500 micrometers, inclusive of the recited values. For purposes of non-limiting illustration and with reference to FIG. 1, elongated grooves 11(b) have a length 68 and elongated grooves 11(a) have a length 71. As can be seen from FIG. 1, length 71 of elongated grooves 11(a) is greater than length 68 of elongated grooves 11(b), and correspondingly the length 68 of elongated grooves 11(b) is less than the length 71 of elongated grooves 11(a).

With the method of the present invention, the elongated grooves are formed by irradiating at least a portion of a surface of the optical element with laser radiation. The type of laser and operating parameters thereof are typically selected in light of the composition of the surface of the optical element in which the elongated grooves are to be formed. The wavelength of the laser is typically selected such that the material of the surface of the optical element, in which the elongated grooves are to be formed, will at least sufficiently absorb the incident radiation, resulting in removal of the surface material that is exposed to such radiation. Without intending to be bound by any theory, it is believed, based on the evidence at hand, that irradiating the surface of the optical element with laser radiation, in accordance with the method of the present invention, results in at least pyrolization and/or evaporation of the surface material that is so irradiated, which results in formation of the elongated grooves.

The elongated grooves are, with some embodiments, substantially free of raised portions, such as, but not limited to, raised edges extending upward above the surface of the optical element.

With some embodiments of the present invention, the laser radiation has a wavelength of from 100 micrometers to 400 micrometers, or from 200 micrometers to 380 micrometers, or from 300 micrometers to 370 micrometers. The wavelength of the laser radiation, in accordance with some embodiments, is from 340 micrometers to 360 micrometers, such as 355 micrometers.

The laser used, with some embodiments of the present invention, is a yttrium aluminum garnet (YAG) laser, such as a frequency tripled YAG laser, that is capable of producing at least 500 milliWatts (mW) of power, such as from 500 mW to 5 Watts of power. The laser is typically used in conjunction with an art-recognized optical bench that includes, for example, one or more variable attenuators, a plurality of stationary and adjustable mirrors, a beam expander, a focusing lens, and an optical scanner, such as a galvanometer optical scanner system. The repetition rate and write speeds of the laser can be adjusted, in part depending on the power of the laser, in accordance with art-recognized methods so as to obtain elongated grooves of desired dimensions. With some embodiments, a repetition rate of from 30 killoHurtz (kHz) to 120 kHz, and write speeds of from 100 mm/second to 300 mm/second are used.

Figure 5:
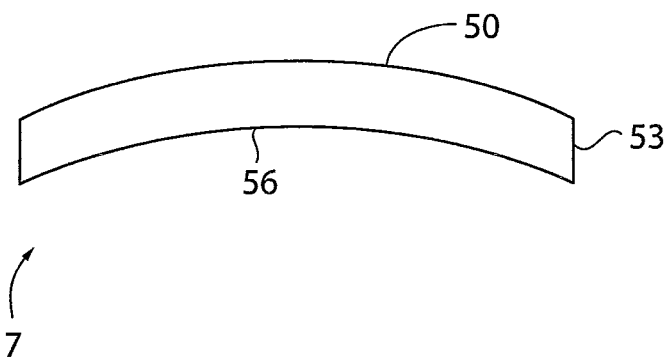
FIG. 5 is a representative side elevational view of an optical element that can be subjected to the method of the present invention.

With some embodiments of the present invention, the surface of the optical element, into which the plurality of elongated grooves are formed, is selected from at least one of a forward surface of the optical element, a side surface of the optical element, and a rear surface of the optical element. For purposes of non-limiting illustration, and with reference to FIG. 5, an optical element 7 in the form of an optical lens, such as but not limited to an ophthalmic lens, has a forward surface 50, a side surface 53, and a rear surface 56. The plurality of elongated grooves can be formed in any portion of forward surface 50, side surface 53, and/or rear surface 56 of optical element 7. When optical element 7 is an ophthalmic lens, rear surface 56 is opposed to the eye of an individual wearing optical element 7, side surface 53 typically resides within a supportive frame, and forward surface 50 faces incident light (not shown) at least a portion of which passes through optical element 7 and into the individual's eye.

With some embodiments, the plurality of grooves can be formed in: the exterior surface of an optical substrate of the optical element; and/or the outer surface of a first film residing over the exterior surface of the optical substrate.

In accordance with some embodiments of the present invention, the optical element comprises an optical substrate having an exterior surface, and the exterior surface of the optical substrate defines the portion of the surface of the optical element into which the plurality of elongated grooves are formed. With non-limiting reference to FIG. 3, optical element 2 includes an optical substrate 38 having an exterior surface 41. Exterior surface 41 defines the portion of the surface of optical element 2 into which a plurality of elongated grooves 32 are formed. A clear film 59 is formed over exterior surface 41 and the plurality of elongated grooves 32, as will be described in further detail herein.

Figure 4:
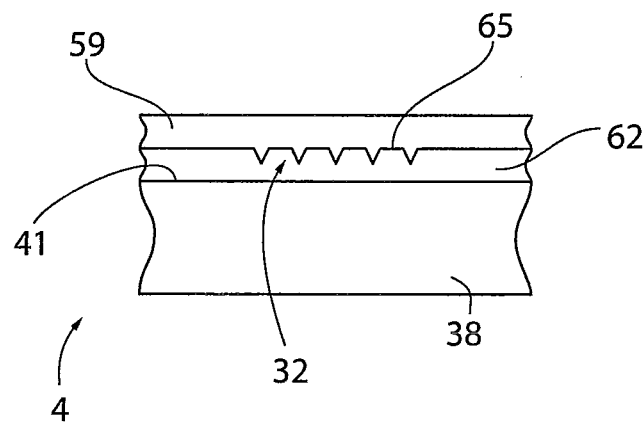
FIG. 4 is a representative sectional view of an optical element prepared in accordance with the method of the present invention, in which a plurality of grooves are formed in a first film layer thereof.

In accordance with some further embodiments of the present invention, the optical element comprises an optical substrate having an exterior surface and a first film having an outer surface over at least a portion of the exterior surface of the optical substrate. The outer surface of the first film defines the portion of the surface of the optical element into which the plurality of elongated grooves are formed. With reference to FIG. 4, and for purposes of non-limiting illustration, optical element 4 includes an optical substrate 38 having an exterior surface 41 and a first film 62 that resides over exterior surface 41. First film 62 has an outer surface 65, which defines the portion of the surface of optical element 4 into which the plurality of elongated grooves 32 are formed. A clear film 59 is formed over outer surface 65 of first film 62 and the plurality of elongated grooves 32 formed therein, as will be described in further detail herein.

The first film into which the plurality of elongated grooves are formed, with some embodiments of the present invention, can be a single layer film or a multi-layered film. The first film, with some embodiments, includes one or more organic polymers. The first film, with some further embodiments, can be formed from one or more polymeric sheets, one or more coating compositions, and combinations thereof. The first film, in accordance with some embodiments, can be selected from thermoplastic first films, crosslinked first films, and combinations thereof. In accordance with some further embodiments of the present invention, the first film is formed from a first coating composition.

The first film, with some additional embodiments, can include a static dye, a photochromic material, a photochromic-dichroic material, or a combination of two or more thereof, as will be discussed in further detail herein. In accordance with some embodiments, the first film is free of static dyes, photochromic materials, and photochromic-dichroic materials.

The method of the present invention further includes forming a clear film over at least a portion of the surface of the optical element and the plurality of elongated grooves. The clear film is formed over the whole of the plurality of elongated grooves, with some embodiments. The clear film is required so that the mark is: (i) substantially unobservable when a source of electromagnetic energy is viewed through the optical element at a first position that has a first alignment with the center point (of the plurality of elongated grooves) that is substantially parallel to the common longitudinal direction; and (ii) substantially observable when the source of electromagnetic energy is viewed through the optical element at a second position that has a second alignment with the center point that is substantially orthogonal to the common longitudinal direction. In the absence of the clear film, the mark is observable under both conditions (i) and (ii). The clear film and other optional films and/or layers (such as but not limited to the first film) that are formed on or over the optical element each have clarity at least sufficient so as to allow observance of a source of electromagnetic radiation through the optical element. With some embodiments, the clear film and other optional films and/or layers each independently have a percent transmittance of greater than 0% and less than or equal to 100%, such as from 50% to 100%.

With some embodiments, the surface of the optical element into which the elongated grooves are formed and the clear film formed thereover each have different refractive index values. While not intending to be bound by any theory, it is believed that different refractive index values, of the surface of the optical element into which the elongated grooves are formed and the clear film formed thereover, allows the mark to be unobservable under condition (i) and observable under condition (ii) as described above.

In accordance with some embodiments: the portion of the surface of the optical element (into which the elongated grooves are formed) has a first refractive index; the clear film has a second refractive index; and a difference between the first refractive index and the second refractive index has an absolute value of greater than or equal to 0.01, such as from 0.01 to 1.5, or from 0.01 to 1.2, or from 0.1 to 1.0, or from 0.2 to 0.8, inclusive of the recited values.

The clear film can be a single layer film or a multi-layered film. One or more layers of the clear film can include, a static dye, a photochromic material, a photochromic-dichroic material, or a combination of two or more thereof, as will be discussed in further detail herein. The clear film, with some embodiments, includes one or more organic polymers. The clear film, with some embodiments, can be formed from one or more polymeric sheets, one or more coating compositions, and combinations thereof.

The clear film, in accordance with some embodiments, can be selected from thermoplastic clear films, crosslinked clear films, and combinations thereof. In accordance with some further embodiments of the present invention, the clear film is formed from a clear coating composition.

As discussed previously herein, the mark or marks of optical elements prepared in accordance with the present invention and according to the present invention can be converted from unobservable to observable, and visa versa, depending on the orientation of a source of electromagnetic energy as viewed through the optical element relative to the common longitudinal direction of the plurality of elongated grooves. The marks can be observable, and correspondingly unobservable, by suitable means, such as visually observable and visually unobservable, and/or electrooptically observable and electrooptically unobservable. Observance of the mark or marks can be enhanced, as with some embodiments, by the concurrent use of magnification of the mark, such as one or more magnifying lenses interposed between the mark and the observer. The marks can be visually observable and visually unobservable by naked eye observation when, with some embodiments, the source of electromagnetic radiation is a source of visible light and the electromagnetic light reflected and/or refracted by the mark is visible light. The source of visible light, with some embodiments, is a source of non-coherent light. The source of visible light can, with some embodiments, have one or more wavelengths from 380 nanometers to 710 nanometers, inclusive of the recited values.

Figure 7:
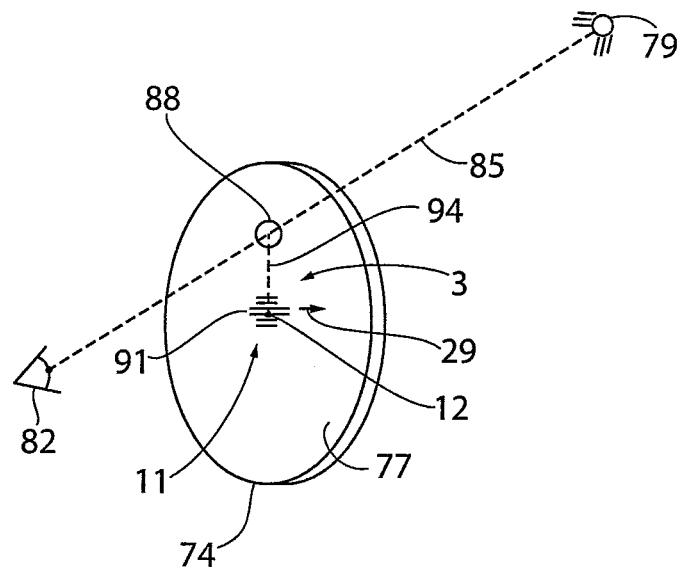
FIG. 7 is a representative perspective schematic view of the relative positioning of a viewer, an optical element, and a source of electromagnetic energy, such that the mark on the optical element is observable.

For purposes of illustrating how, with some embodiments, a mark prepared in accordance with the present invention can be observed, non-limiting reference is made to FIG. 7, in which an optical element 74 is interposed between a source of electromagnetic energy 79 and an observer 82. Optical element 74 has a surface 77, which can be a forward surface or a rear surface, into which a plurality of grooves 11 has been formed in accordance with the method of the present invention. The plurality of grooves 11 has a common longitudinal direction 29 and defines mark 3. Optical element 74 also includes a clear film (not shown) over surface 77 and the plurality of elongated grooves 11. Observer 82 can be a living observer, such as a human observer, or a non-living observer, such as an electrooptic device.

With further reference to FIG. 7, observer 82 views the source of electromagnetic energy 79 through optical element 74 along a line of sight indicated by dashed line 85. This results in the source of electromagnetic energy 79 being viewed by observer 82 at a position 88, which can be a first position or a second position, within the optical element 74. To observe mark 3, position 88 can, with some embodiments, be any position in optical lens 74 other than the position 91 that is occupied by mark 3. If position 88 corresponds to position 91, then mark 3 is, with some embodiments, substantially unobservable regardless of the orientation of common longitudinal direction 29.

As depicted in FIG. 7, position 88 of the source of electromagnetic energy 79 as viewed by observer 82 within optical element 74 resides above mark 3, and is a second position 88. Second position 88 has a second alignment with center point 12 of the plurality of elongated grooves 11 as depicted by dashed line 94. When second alignment 94 of second position 88 is substantially perpendicular to common longitudinal direction 29, mark 3 is substantially observable to observer 82. See, for example, FIG. 2, in which the second alignment 94 of second position 88 is more clearly depicted as being substantially perpendicular to common longitudinal direction 29, in each case relative to center point 12.

Figure 2:
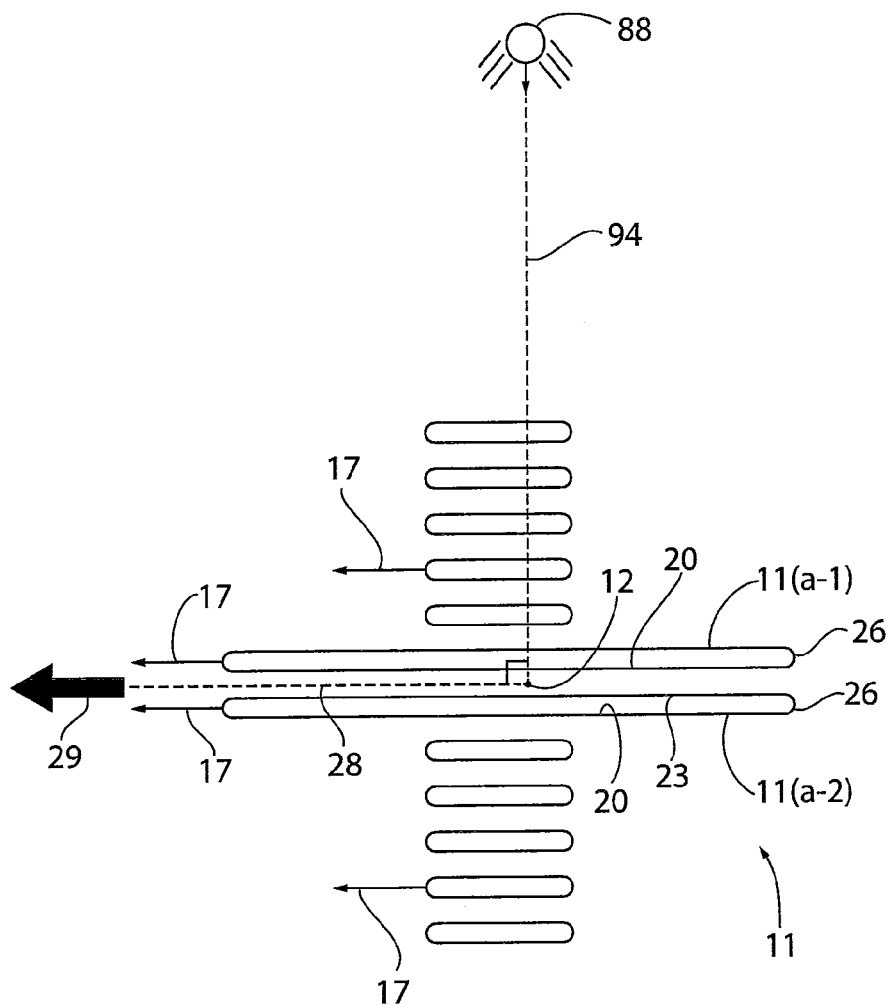
FIG. 2 is a representative top plan view of the mark of FIG. 1, in which the optical element has been rotated 90°, such that the source of electromagnetic radiation is represented as being viewed through the optical element at a second position that is substantially orthogonal to the common longitudinal direction of the plurality of grooves.

While not intending to be bound by any theory it is believed, based on the evidence at hand, that the mark, such as mark 3, is observable when the source of electromagnetic energy is viewed through the optical element at a second position that has a second alignment with the center point that is substantially orthogonal to the common longitudinal direction, because more electromagnetic energy is reflected from the elongated sidewalls of the elongated grooves which provide a larger reflective surface area, than the terminal ends of the elongated grooves which provide a smaller reflective surface area. With reference to FIG. 2 and FIG. 7, elongated first sidewalls 20 are positioned substantially orthogonal and in facing opposition relative to the second alignment 94 of the second position 88 of the source of electromagnetic energy 79 as observed through optical element 74, which results in more electromagnetic energy being reflected from the larger surface area presented by the elongated first sidewalls 20.

In addition, and without intending to be bound by theory, it is believed that some of the incident electromagnetic energy can be reflected between the first 20 and second 23 elongated sidewalls of the plurality of elongated grooves, which can further improve or increase observance of the mark when oriented so as to be observable, as depicted in FIG. 2 and FIG. 7, and as described above.

Figure 8:
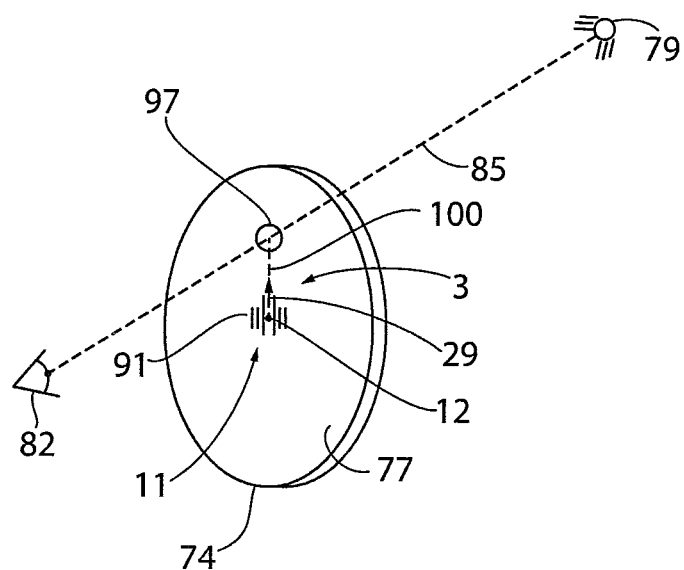
FIG. 8 is a representative perspective schematic view of the relative positioning of a viewer, an optical element, and a source of electromagnetic energy, such that the mark on the optical element is unobservable.

For purposes of illustrating how, with some embodiments, a mark prepared in accordance with the present invention can be unobservable, non-limiting reference is made to FIG. 8, in which an optical element 74 is interposed between a source of electromagnetic energy 79 and an observer 82. Optical element 74 and observer 82 are each as described previously herein with regard to FIG. 7. For purposes of illustration, mark 3 is visibly depicted within FIG. 8, but would be unobservable to observer 82.

With further reference to FIG. 8, observer 82 views the source of electromagnetic energy 79 through optical element 74 along a line of sight indicated by dashed line 85. This results in the source of electromagnetic energy 79 being viewed by observer 82 at a position 97, which can be a first position or a second position, within the optical element 74.

As depicted in FIG. 8, position 97 of the source of electromagnetic energy 79 as viewed by observer 82 within optical element 74 resides above mark 3, and is a first position 97. First position 97 has a first alignment with center point 12 of the plurality of elongated grooves 11 as depicted by dashed line 100. When first alignment 100 of first position 97 is substantially parallel to common longitudinal direction 29, mark 3 is substantially unobservable to observer 82. See, for example, FIG. 1, in which the first alignment 100 of first position 97 is more clearly depicted as being substantially parallel to common longitudinal direction 29, in each case relative to center point 12.

While not intending to be bound by any theory it is believed, based on the evidence at hand, that the mark, such as mark 3, is substantially unobservable when the source of electromagnetic energy is viewed through the optical element at a first position that has a first alignment with the center point that is substantially parallel to the common longitudinal direction, because less electromagnetic energy is reflected from the terminal ends of the elongated grooves which provide a smaller reflective surface area, than the elongated sidewalls of the elongated grooves which provide a larger reflective surface area. With reference to FIG. 1 and FIG. 8, elongated first sidewalls 20 and elongated second sidewalls 23 are positioned substantially parallel and not in facing opposition relative to the first alignment 100 of the first position 97 of the source of electromagnetic energy 79 as observed through optical element 74. As such, a minimum of electromagnetic energy is reflected from the surfaces of the elongated first sidewalls 20 and elongated second sidewalls 23. In addition, half of the terminal ends, such as first terminal ends 26, of the plurality of elongated grooves, are in facing opposition relative to the first alignment 100 of the first position 97 of the source of electromagnetic energy 79 as observed through optical element 74, which results in less reflected electromagnetic energy due to the smaller surface area presented by the terminal ends.

In addition, and without intending to be bound by theory, it is believed that a minimum of the incident electromagnetic energy can be reflected between first terminal end 26 and second terminal end 27 of the plurality of elongated grooves, due to the larger separation there-between (as compared to the smaller separation between elongated sidewalls 20 and 23). A minimum of reflected electromagnetic energy between the terminal ends of the plurality of elongated grooves is believed to further reduce or decrease observance of the mark when oriented so as to be unobservable, as depicted in FIG. 1 and FIG. 8, and as described above.

With some embodiments, the mark can be converted between observable and unobservable by rotating the optical element through 90° around a center axis with the observer and source of electromagnetic energy each at a fixed position. The optical element can be rotated back and forth between a single 90° arc, or sequentially through successive 90° arcs. With some embodiments, the intensity of observance of the mark can vary as the optical element is rotated through a 90° arc between a first position when the mark is substantially unobservable and a second position when the mark is substantially observable. For purposes of illustration, and with reference to FIG. 1 and FIG. 2, when the optical element is rotated through 90° between the orientation depicted in FIG. 1 (substantially unobservable) to the orientation depicted if FIG. 2 (substantially observable) the intensity of observance of the mark, with some embodiments, will gradually increase as the optical element is rotated through the 90° arc, until it reaches the second position depicted in FIG. 2, where the intensity of observance of the mark is at a maximum. Correspondingly, with some embodiments, and with further reference to FIG. 1 and FIG. 2, when the optical element is rotated through 90° between the orientation depicted in FIG. 2 (substantially observable) to the orientation depicted if FIG. 1 (substantially unobservable) the intensity of observance of the mark, with some embodiments, will gradually decrease as the optical element is rotated through the 90° arc, until it reaches the first position depicted in FIG. 1, where the intensity of observance of the mark is at a minimum.

The method of the present invention can be used to form marks in the form of indicia, patterns and designs. Examples of indicia include, but are not limited to, letters and numbers from one or more languages. With some embodiments, the mark is in the form of, or a plurality of marks together define, a one-dimensional barcode and/or a two dimensional barcode.

Figure 6:
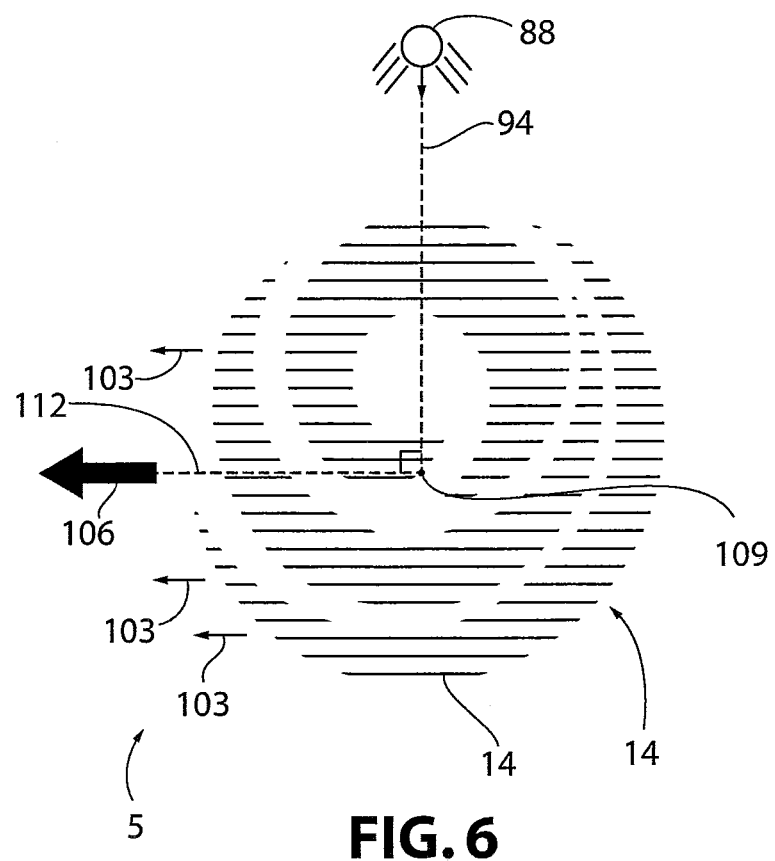
FIG. 6 is a representative top plan view of a plurality of grooves that define a mark prepared in accordance with the method of the present invention.

For purposes of non-limiting illustration and with reference to FIG. 6, there is depicted a plurality of elongated grooves 14 according to the present invention that define a mark 5 in the form of a design. The plurality of elongated grooves 14 each have a longitudinal axis 103 that is aligned substantially parallel with a common longitudinal direction 106 that extends from a center point 109 of the plurality of elongated grooves 14, as depicted by dashed line 112. The plurality of elongated grooves 14, which are of varying length and position, are formed in the surface of an optical element (not depicted) and have a clear film (not depicted) thereover, in accordance with the method of the present invention as described previously herein. Mark 5 of FIG. 6 is positioned so as to be substantially observable. For purposes of non-limiting illustration, if mark 3 of optical element 74 of FIG. 7 is replaced with mark 5 of FIG. 6, then second position 88 has a second alignment with center point 109 of the plurality of elongated grooves 14 as depicted by dashed line 94. When second alignment 94 of second position 88 is substantially perpendicular to common longitudinal direction 106, mark 5 is substantially observable to observer 82.

As described previously herein the clear film and the first film can each independently be a single layered film or a multilayered film. Each layer of the clear film and the first film can in each case be independently selected from thermoplastic films, crosslinked films, and combinations thereof. Each layer of the clear film and the first film can in each case be independently formed from a polymeric sheet and a coating composition.

Examples of polymeric materials that can be used in forming one or more layers of the clear film and/or the first film include, but are not limited to: polyvinyl alcohol, polyvinyl chloride, polyurethane, polyacrylate, and polycaprolactam. With some embodiments, one or more polymeric sheet can be a least partially ordered, for example, by unilateral or bilateral stretching.

Coating compositions that can be used to form the one or more layers of the clear film and/or the first film include, with some embodiments, a curable resin composition, and optionally a solvent. The coating compositions can be in the form of art-recognized liquid coating compositions and powder coating compositions. The coating compositions can be thermoplastic or thermosetting coating compositions. With some embodiments, the coating compositions are selected from curable or thermosetting coating compositions.

The curable resin composition of the curable coating compositions according that can be used to form one or more layers of the clear film and/or the first film typically include: a first reactant (or component) having functional groups, e.g., an epoxide functional polymer reactant; and a second reactant (or component) that is a crosslinking agent having functional groups that are reactive towards and that can form covalent bonds with the functional groups of the first reactant. The first and second reactants of the curable resin composition can each independently include one or more functional species, and are each present in amounts sufficient to provide cured coatings having a desirable combination of physical properties, e.g., smoothness, optical clarity, solvent resistance and hardness.

Examples of curable resin compositions that can be used with the curable coating compositions include, but are not limited to: curable resin compositions that include an epoxide functional polymer, such as (meth)acrylic polymers containing residues of glycidyl (meth)acrylate, and an epoxide reactive crosslinking agent (e.g., containing active hydrogens, such as hydroxyls, thiols and amines); curable resin compositions that include active hydrogen functional polymer, such as hydroxy functional polymer, and capped (or blocked) isocyanate functional crosslinking agent; and curable resin compositions that include active hydrogen functional polymer, such as hydroxy functional polymer, and melamine crosslinking agent.

With some embodiments, the curable resin composition of the coating compositions that can be used to form one or more layer of the clear film and/or the first film is a curable urethane (or polyurethane) resin composition. Curable urethane resin compositions useful in forming one or more layer of the clear film and/or the first film typically include: an active hydrogen functional polymer, such as a hydroxy functional polymer; and a capped (or blocked) isocyanate functional crosslinking agent. Hydroxy functional polymers that can be used in such compositions include, but are not limited to, art-recognized hydroxy functional vinyl polymers, hydroxy functional polyesters, hydroxy functional polyurethanes and mixtures thereof.

Vinyl polymers having hydroxy functionality can be prepared by free radical polymerization methods that are known to those of ordinary skill in the art. With some embodiments of the present invention, the hydroxy functional vinyl polymer is prepared from a majority of (meth)acrylate monomers and is referred to herein as a "hydroxy functional (meth) acrylic polymer."

Hydroxy functional polyesters useful in curable coating compositions that include capped isocyanate functional crosslinking agents can be prepared by art-recognized methods. Typically, diols and dicarboxylic acids or diesters of dicarboxylic acids are reacted in a proportion such that the molar equivalents of hydroxy groups is greater than that of carboxylic acid groups (or esters of carboxylic acid groups) with the concurrent removal of water or alcohols from the reaction medium.

Hydroxy functional urethanes can be prepared by art-recognized methods. Typically one or more difunctional isocyanates are reacted with one or more materials having two active hydrogen groups (e.g., diols or dithiols), such that the ratio of active hydrogen groups to isocyanate groups is greater than 1, as is known to the skilled artisan.

By "capped (or blocked) isocyanate crosslinking agent" is meant a crosslinking agent having two or more capped isocyanate groups that can decap (or deblock) under cure conditions, e.g., at elevated temperature, to form free isocyanate groups and free capping groups. The free isocyanate groups formed by decapping of the crosslinking agent are typically capable of reacting and forming substantially permanent covalent bonds with the active hydrogen groups of the active hydrogen functional polymer (e.g., with the hydroxy groups of a hydroxy functional polymer).

It is desirable that the capping group of the capped isocyanate crosslinking agent not adversely affect the curable coating composition upon decapping from the isocyanate (i.e., when it becomes a free capping group). For example, it is desirable that the free capping group neither become trapped in the cured film as gas bubbles nor excessively plasticize the cured film. Capping groups useful in the present invention typically have the characteristics of being nonfugitive or capable of escaping substantially from the forming coating prior to its vitrification. Typically, the free capping groups escape substantially from the forming (e.g., curing) coating prior to its vitrification.

Classes of capping groups of the capped isocyanate crosslinking agent can be selected from, include, but are not limited to: hydroxy functional compounds, e.g., linear or branched $C_2$-$C_8$ alcohols, ethylene glycol butyl ether, phenol and p-hydroxy methylbenzoate; 1H-azoles, e.g., 1H-1,2,4-triazole and 1H-2,5-dimethylpyrazole; lactams, e.g., e-caprolactam and 2-pyrrolidinone; ketoximes, e.g., 2-propanone oxime and 2-butanone oxime. Other suitable capping groups include, but are not limited to, morpholine, 3-aminopropyl morpholine and N-hydroxy phthalimide.

The isocyanate or mixture of isocyanates of the capped isocyanate crosslinking agent has two or more isocyanate groups (e.g., 3 or 4 isocyanate groups). Examples of suitable isocyanates that can be used to prepare the capped isocyanate crosslinking agent include, but are not limited to monomeric diisocyanates, e.g., $\alpha,\alpha'$-xylylene diisocyanate, $\alpha,\alpha,\alpha',\alpha'$-tetramethylxylylene diisocyanate and 1-isocyanato-3-isocyanatomethyl-3,5,5-trimethylcyclohexane (isophorone diisocyanate or IPDI), and dimers and trimers of monomeric diisocyanates containing isocyanurate, uretidino, biruet or allophanate linkages, e.g., the trimer of IPDI.

The capped isocyanate crosslinking agent can also be selected from oligomeric capped isocyanate functional adducts. As used herein, by "oligomeric capped polyisocyanate functional adduct" is meant a material that is substantially free of polymeric chain extension. Oligomeric capped polyisocyanate functional adducts can be prepared by art-recognized methods from, for example, a compound containing three or more active hydrogen groups, e.g., trimethylolpropane (TMP), and an isocyanate monomer, e.g., 1-isocyanato-3,3,5-trimethyl-5-isocyanatomethylcyclohexane (IPDI), in a molar ratio of 1:3, respectively. In the case of TMP and IPDI, by employing art-recognized starved feed and/or dilute solution synthesis techniques, an oligomeric adduct having an average isocyanate functionality of 3 can be prepared (e.g., "TMP-31PDI"). The three free isocyanate groups per TMP-31PDI adduct are then capped with a capping group, e.g., a linear or branched $C_2$-$C_8$ alcohol.

To catalyze the reaction between the isocyanate groups of the capped polyisocyanate crosslinking agent and the hydroxy groups of the hydroxy functional polymer, one or more catalysts are typically present in the curable photochromic coating composition in amounts of from, for example, 0.1 to 5 percent by weight, based on total resin solids of the composition. Classes of useful catalysts include but are not limited to, metal compounds, in particular, organic tin compounds, e.g., tin(II) octanoate and dibutyltin(IV) dilaurate, and tertiary amines, e.g., diazabicyclo[2.2.2]octane.

Curable coating compositions that can be used to form one or layers of the clear film and/or the first film, which include hydroxy functional polymer and capped isocyanate functional crosslinking agent, typically have present therein hydroxy functional polymer in an amount of from 55 percent to 95 percent by weight, based on total resin solids weight of the composition, e.g., from 75 percent to 90 percent by weight, based on total resin solids weight of the composition. The capped isocyanate functional crosslinking agent is typically present in the curable resin composition in an amount corresponding to the balance of these recited ranges, i.e., 5 to 45, particularly 10 to 25, percent by weight.

With the curable urethane resin compositions that can be used to form one or more layers of the clear film and/or the first film, the equivalent ratio of isocyanate equivalents in the capped isocyanate crosslinking agent to hydroxy equivalents in the hydroxy functional polymer is typically within the range of 1:3 to 3:1, e.g., 1:2 to 2:1. While equivalent ratios outside of this range can be employed, they are generally less desirable due to performance deficiencies in the cured films obtained therefrom. Curable coating compositions that include hydroxy functional polymer and capped isocyanate functional crosslinking agent are typically cured at a temperature of from 120° C. to 190° C. over a period of from 10 to 60 minutes.

Coating compositions that can be used to form one or more layers of the clear film and/or first film can, with some embodiments, optionally further include a solvent. Examples of suitable solvents include, but art not limited to, acetates, alcohols, ketones, glycols, ethers, aliphatics, cycloaliphatics and aromatics. Examples of acetates include, but are not limited to, ethyl acetate, butyl acetate, and glycol acetate. Examples of ketones include, but are not limited to, methyl ethyl ketone and methyl-N-amyl ketone. Examples of aromatics include, but are not limited to, are toluene, naphthalene and xylene. In an embodiment, one or more solvents are added to each of the first reactant and the second reactant. Suitable solvent blends can include, for example, one or more acetates, propanol and its derivatives, one or more ketones, one or more alcohols and/or one or more aromatics. If present, the solvent is typically present in an amount of from 5 to 60 percent by weight, or 5 to 40 percent by weight, or 10 to 25 percent by weight, based on the total weight of the coating composition (inclusive of the solvent weight).

Curable coating compositions that can be used to form one or more layers of the clear film and/or the first film, with some embodiments, optionally contain additives such as waxes for flow and wetting, flow control agents, e.g., poly(2-ethylhexyl)acrylate, adjuvant resin to modify and optimize coating properties, antioxidants and ultraviolet (UV) light absorbers. Examples of useful antioxidants and UV light absorbers include those available commercially from Ciba-Geigy under the trademarks IRGANOX and TINUVIN. These optional additives, when used, are typically present in amounts up to 20 percent by weight (e.g., from 0.5 to 10 percent by weight), based on total weight of resin solids of the curable resin composition.

With some embodiments, one or more layers of the clear film and/or one or more layers of the first film can each independently include a static dye, a photochromic material, a photochromic-dichroic material, or a combination of two or more thereof. Alternatively or additionally, the optical substrate of the optical element of the present invention can include a static dye, a photochromic material, a photochromic-dichroic material, or a combination of two or more thereof. The following description with regard to static dyes, photochromic compounds and photochromic-dichroic compounds that can, with some embodiments, be present in one or more layers of the clear film and/or one or more layers of the first film, is also applicable to static dyes, photochromic compounds and photochromic-dichroic compounds that can, with some embodiments, be alternatively or additionally present in the optical substrate of the optical element of the present invention.

Classes and examples of static dyes that can be present in one or more layers of the clear film and one or more layers of the first film include, but are not limited to, art-recognized inorganic static dyes and organic static dyes.

Classes of photochromic compounds that can be present in one or more layers of the clear film and one or more layers of the first film include, but are not limited to, "conventional photochromic compounds." As used herein, the term "conventional photochromic compound" includes both thermally reversible and non-thermally reversible (or photo-reversible) photochromic compounds. Generally, although not limiting herein, when two or more conventional photochromic materials are used in combination with each other or with a photochromic-dichroic compound, the various materials can be chosen to complement one another to produce a desired color or hue. For example, mixtures of photochromic compounds can be used according to certain non-limiting embodiments disclosed herein to attain certain activated colors, such as a near neutral gray or near neutral brown. See, for example, U.S. Pat. No. 5,645,767, column 12, line 66 to column 13, line 19, the disclosure of which is specifically incorporated by reference herein, which describes the parameters that define neutral gray and brown colors.

Examples of photochromic materials or compounds that can be present in one or more layers of the clear film and one or more layers of the first film include, but are not limited to, indeno-fused naphthopyrans, naphtho[1,2-b]pyrans, naphtho [2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline) fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof.

Further examples of photochromic compounds, that can be present in one or more layers of the clear film and one or more layers of the first film, can, with some embodiments, be selected from certain indeno-fused napthopyran compounds, such as described in U.S. Pat. No. 6,296,785, at column 3, lines 66 through column 10, line 51, which disclosure is incorporated herein by reference.

With some embodiments, the photochromic compound, that can be present in one or more layers of the clear film and one or more layers of the first film, can be selected from one or more indeno-fused naphthopyran compounds having a pi-conjugation extending group, such as a halogen or halogen substituted group, bonded to the 11-position of the indeno-fused naphthopyran. Examples of indeno-fused naphthopyran compounds having a pi-conjugation extending bonded to the 11-position thereof include, but are not limited to, those disclosed in United States Patent Application Publication No. US 2011/0049445 A1 at paragraphs [0030] through [0080].

The photochromic compounds, with some embodiments, that can be present in one or more layers of the clear film and one or more layers of the first film, can be covalently bonded to the matrix, such as the organic matrix, of the of the layer of the film. With some embodiments, the photochromic compounds can include one or more reactive groups, such as one or more polymerizable groups. With some embodiments, the photochromic compounds can be selected from 2H-naphtho [1,2-b]pyrans, 3H-naphtho[2,1-b]pyrans and/or indeno[2,1-f]naphtho[1,2-b]pyrans each having at least one functional group that is capable of forming a covalent bond with another functional group, such as at least one polymerizable group, such as at least one polyalkoxylated substituent of from 1 to 50 alkoxy units per substituent which is end-capped (or terminated) with a polymerizable group. Examples of such photochromic compounds include, but are not limited to, those disclosed in U.S. Pat. No. 6,113,814, at column 2, line 52 through column 8, line 40, which disclosure is incorporated herein by reference.

Photochromic-dichroic materials and compounds that can be included in one or more layers of the clear film and/or one or more layers of the first film include art-recognized photochromic-dichroic materials and compounds. Photochromic-dichroic compounds typically have a photochromic group (P) and at least one lengthening agent or group (L) covalently bonded thereto. The photochromic groups of the photochromic-dichroic compounds can be selected from those classes and examples as described previously herein with regard to the photochromic compounds, such as, but not limited to, pyrans, oxazines, and fulgides. Examples of photochromic-dichroic compounds that can be included in one or more layers of the clear film and/or one or more layers of the first film, include, but are not limited to those disclosed in U.S. Pat. No. 7,256,921 B2 at column 19, line 3 through column 22, line 46, which disclosure is incorporated herein by reference. Examples of lengthening groups (L) and photochromic groups (P) include, but are not limited to those disclosed in U.S. Pat. No. 7,256,921 B2 at column 22, line 47 through column 35, line 27, which disclosure is incorporated herein by reference.

The photochromic-dichroic layer(s) can include art-recognized additives, such as but not limited to, static dyes, alignment promoters, kinetic enhancing additives, photoinitiators, thermal initiators, polymerization inhibitors, solvents, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, and adhesion promoters (such as hexanediol diacrylate and coupling agents). Non-limiting examples of such additives are disclosed in U.S. Pat. No. 7,256,921 B2 at column 14, line 39 through column 16, line 7, which disclosure is incorporated herein by reference.

The photochromic and photochromic-dichroic compounds can be introduced into a particular film, layer, or optical substrate in accordance with art-recognized methods. Such art-recognized methods include, but are not limited to, imbibition, and incorporating the photochromic and/or photochromic-dichroic compounds into a composition from which the particular film, layer or optical substrate is prepared.

The photochromic compounds and/or photochromic-dichroic compounds can be present in one or more layers of the clear and/or first films, and/or the optical substrate, in amounts (or ratios) such that the optical element of the present invention exhibits desired optical properties. For purposes of non-limiting illustration, the amount and types of photochromic compounds and/or photochromic-dichroic compounds can be selected such that the optical element is clear or colorless when the photochromic compounds and/or photochromic-dichroic compounds are in the closed-form (e.g., in the bleached or unactivated state), and can exhibit a desired resultant color when the photochromic compounds and/or photochromic-dichroic compounds are in the open-form (e.g., when activated by actinic radiation). The precise amount of the photochromic compounds and/or photochromic-dichroic compounds that are utilized is not critical, provided that a sufficient amount is used to produce the desired effect. The particular amount of the photochromic compounds and/or photochromic-dichroic compounds used can depend on a variety of factors, such as but not limited to, the absorption characteristics of the photochromic compounds and/or photochromic-dichroic compounds, the color and intensity of the color desired upon activation, and the method used to incorporate the photochromic compounds and/or photochromic-dichroic compounds into a particular layer. Although not limiting herein, according to various non-limiting embodiments disclosed herein, the amount of the photochromic compounds and/or photochromic-dichroic compounds that are incorporated into a layer of the optical element can range from 0.01 to 40 weight percent, or from 0.05 to 15, or from 0.1 to 5 weight percent, based on the weight of the layer. The same amounts and ranges are applicable with regard to the amount of the photochromic compounds and/or photochromic-dichroic compounds that are alternatively or additionally incorporated into the optical substrate of the optical element of the present invention.

When one or more films of the optical elements of the present invention include a photochromic-dichroic compound, an alignment layer can optionally also be present, with some embodiments. The alignment layer can also be referred to herein as an orientation facility. The photochromic-dichroic compound of a photochromic-dichroic layer can be at least partially aligned by interaction with the alignment layer, which can be an underlying alignment layer in accordance with some embodiments.

As used herein the term "alignment layer" means a layer that can facilitate the positioning of one or more other structures that are exposed, directly and/or indirectly, to at least a portion thereof. As used herein the term "order" means bring into a suitable arrangement or position, such as aligning with another structure or material, or by some other force or effect. Thus, as used herein the term "order" encompasses both contact methods of ordering a material, such as by aligning with another structure or material, and non-contact methods of ordering a material, such as by exposure to an external force or effect. The term order also encompasses combinations of contact and non-contact methods. Examples and methods relating to alignment layers and orientation facilities that can be used in conjunction with a layer including a photochromic-dichroic compound include those known to the skilled artisan, such as those disclosed in U.S. Pat. No. 7,256,921 B2 at column 66, line 61 through column 78, line 3, which disclosure is incorporated herein by reference.

The optical elements prepared by the method of and according to the present invention can optionally include one or more films in addition to the clear film and the first film. Examples of such additional films include, but are not limited to: primer coatings and films (which typically reside under the first film, if present); protective coatings and films (which are typically applied over the clear film), including transitional coatings and films and abrasion resistant coatings and films; anti-reflective coatings and films; polarizing coatings and films; and combinations thereof. As used herein the term "protective coating or film" refers to coatings or films that can prevent wear or abrasion, provide a transition in properties from one coating or film to another, protect against the effects of polymerization reaction chemicals and/or protect against deterioration due to environmental conditions such as moisture, heat, ultraviolet light, oxygen, etc.

As used herein, the term "transitional coating and film" means a coating or film that aids in creating a gradient in properties between two coatings or films, or a coating and a film. For example, although not limiting herein, a transitional coating can aid in creating a gradient in hardness between a relatively hard coating and a relatively soft coating. Non-limiting examples of transitional coatings include radiation-cured, acrylate-based thin films as described in U.S. Patent Application Publication 2003/0165686 at paragraphs 79-173, which are hereby specifically incorporated by reference herein.

As used herein the term "abrasion resistant coating and film" refers to a protective polymeric material that demonstrates a resistance to abrasion that is greater than a standard reference material, e.g., a polymer made of CR-39® monomer available from PPG Industries, Inc, as tested in a method comparable to ASTM F-735 Standard Test Method for Abrasion Resistance of Transparent Plastics and Coatings Using the Oscillating Sand Method. Non-limiting examples of abrasion resistant coatings include, for example, abrasion-resistant coatings comprising organosilanes, organosiloxanes, abrasion-resistant coatings based on inorganic materials such as silica, titania and/or zirconia, organic abrasion-resistant coatings of the type that are ultraviolet light curable, oxygen barrier-coatings, UV-shielding coatings, and combinations thereof. Non-limiting examples of commercial hard coating products include SILVUE® 124 and HI-GARD® coatings, available from SDC Coatings, Inc. and PPG Industries, Inc., respectively.

The abrasion resistant coating or film (or hard coat layer) can, with some embodiments, be selected from art-recognized hard coat materials, such as organo-silane abrasion-resistant coatings. Organo-silane abrasion-resistant coatings, often referred to as hard coats or silicone-based hard coatings, are well known in the art, and are commercially available from various manufacturers, such as SDC Coatings, Inc. and PPG Industries, Inc. Reference is made to U.S. Pat. No. 4,756,973 at column 5, lines 1-45; and to U.S. Pat. No. 5,462,806 at column 1, lines 58 through column 2, line 8, and column 3, line 52 through column 5, line 50, which disclosures describe organo-silane hard coatings and which disclosures are incorporated herein by reference. Reference is also made to U.S. Pat. Nos. 4,731,264, 5,134,191, 5,231,156 and International Patent Publication WO 94/20581 for disclosures of organo-silane hard coatings, which disclosures are also incorporated herein by reference. The hard coat layer can be applied by art-recognized coating methods such as, but not limited to, roll coating, spray coating, curtain coating, and spin coating.

Non-limiting examples of antireflective coatings and films include a monolayer, multilayer or film of metal oxides, metal fluorides, or other such materials, which can be deposited onto the articles disclosed herein (or onto films that are applied to the articles), for example, through vacuum deposition, sputtering, etc. Non-limiting examples of conventional photochromic coatings and films include, but are not limited to, coatings and films comprising conventional photochromic materials. Non-limiting examples of polarizing coatings and films include, but are not limited to, coatings and films comprising dichroic compounds that are known in the art.

With some embodiments, the optical element of the present invention includes an optical substrate, and the optical substrate includes an inorganic material, an organic polymeric material, and combinations thereof.

Non-limiting examples of inorganic materials suitable for use in forming the optical substrate of the optical element of the present invention include glasses, such as silica based glasses, minerals, ceramics, and metals. For example, in one non-limiting embodiment the optical substrate can include glass. In other non-limiting embodiments, the optical substrate can have a reflective surface, for example, a polished ceramic substrate, metal substrate, or mineral substrate. In other non-limiting embodiments, a reflective coating or layer can be deposited or otherwise applied to a surface of an inorganic or an organic substrate to make it reflective or to enhance its reflectivity.

Non-limiting examples of organic materials that can be used to form the optical substrate of the optical elements of the present invention, include polymeric materials, for example, homopolymers and copolymers, prepared from the monomers and mixtures of monomers disclosed in U.S. Pat. No. 5,962,617 and in U.S. Pat. No. 5,658,501 from column 15, line 28 to column 16, line 17, the disclosures of which U.S. patents are specifically incorporated herein by reference. For example, such polymeric materials can be thermoplastic or thermoset polymeric materials, can be transparent or optically clear, and can have any refractive index required. Non-limiting examples of such disclosed monomers and polymers include: polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly (ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

The optical substrate can, with some embodiments, be an ophthalmic substrate. Non-limiting examples of organic materials suitable for use in forming ophthalmic substrates include, but are not limited to, the art-recognized polymers that are useful as ophthalmic substrates, such as organic optical resins that are used to prepare optically clear castings for optical applications, such as ophthalmic lenses.

In accordance with further embodiments of the present invention, the optical elements of the present invention can be selected from ophthalmic articles or elements, display articles or elements, windows, mirrors, active liquid crystal cell articles or elements, and passive liquid crystal cell articles or elements.

Examples of ophthalmic articles or elements include, but are not limited to, corrective and non-corrective lenses, including single vision or multi-vision lenses, which can be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intra-ocular lenses, magnifying lenses, and protective lenses or visors.

Examples of display articles, elements and devices include, but are not limited to, screens, monitors, and security elements, including without limitation, security marks and authentication marks.

Examples of windows include, but are not limited to, automotive and aircraft transparencies, filters, shutters, and optical switches.

With some embodiments, the optical element can be a security element. Examples of security elements include, but are not limited to, security marks and authentication marks that are connected to at least a portion of a substrate, such as: access cards and passes, e.g., tickets, badges, identification or membership cards, debit cards, etc.; negotiable instruments and non-negotiable instruments e.g., drafts, checks, bonds, notes, certificates of deposit, stock certificates, etc.; government documents, e.g., currency, licenses, identification cards, benefit cards, visas, passports, official certificates, deeds etc.; consumer goods, e.g., software, compact discs ("CDs"), digital-video discs ("DVDs"), appliances, consumer electronics, sporting goods, cars, etc.; credit cards; and merchandise tags, labels and packaging.

With further embodiments, the security element can be connected to at least a portion of a substrate chosen from a transparent substrate and a reflective substrate. Alternatively, according to further embodiments in which a reflective substrate is required, if the substrate is not reflective or sufficiently reflective for the intended application, a reflective material can be first applied to at least a portion of the substrate before the security mark is applied thereto. For example, a reflective aluminum coating can be applied to the at least a portion of the substrate prior to forming the security element thereon. Additionally or alternatively, the security element can be connected to at least a portion of a substrate chosen from untinted substrates, tinted substrates, photochromic substrates, tinted-photochromic substrates, linearly polarizing, circularly polarizing substrates, and elliptically polarizing substrates.

Furthermore, security elements according to the aforementioned embodiments can further include one or more other coatings or films or sheets to form a multi-layer reflective security element with viewing angle dependent characteristics, such as described in U.S. Pat. No. 6,641,874.

The present invention also relates to an optical element that includes at least one mark defined by a plurality of parallel and commonly aligned elongated grooves, and a clear film over residing over at least the plurality of elongated grooves, as described previously herein. The optical element is as described previously herein with regard to the method of forming an optical element, and the drawing figures.

The present invention has been described with reference to specific details of particular embodiments thereof. It is not intended that such details be regarded as limitations upon the scope of the invention except insofar as and to the extent that they are included in the accompanying claims.

What is claimed is:

1. A method of producing an optical element having a mark comprising:
   (a) irradiating at least a portion of a surface of said optical element with laser radiation, thereby forming a plurality of elongated grooves in said portion of said surface, wherein,
   each elongated groove has a longitudinal axis,
   each elongated groove is substantially parallel to an adjacent elongated groove,
   the longitudinal axis of each elongated groove is aligned substantially parallel with a common longitudinal direction that extends from a center point of said plurality of elongated grooves, and
   said plurality of elongated grooves together define said mark; and
   (b) forming a clear film over at least said portion of said surface and said plurality of elongated grooves, wherein,
   said mark is substantially unobservable when a source of electromagnetic energy is viewed through said optical element at a first position that has a first alignment with said center point that is substantially parallel to said common longitudinal direction, and
   said mark is substantially observable when said source of electromagnetic energy is viewed through said optical element at a second position that has a second alignment with said center point that is substantially orthogonal to said common longitudinal direction.

2. The method of claim 1 wherein said laser radiation has a wavelength of from 100 micrometers to 400 micrometers.

3. The method of claim 1 wherein each elongated groove independently has a depth of from 0.1 micrometers to 2 micrometers, and a width of from 10 micrometers to 60 micrometers.

4. The method of claim 1 wherein each pair of elongated grooves independently has a separation distance therebetween of from 2 micrometers to 180 micrometers.

5. The method of claim 1 wherein each elongated groove has a first terminal end and a second terminal end, and for at least one elongated groove said first terminal end and said second terminal end are each independently defined by an arcuate wall.

6. The method of claim 1 wherein each elongated groove is a substantially straight elongated groove.

7. The method of claim 1 wherein said plurality of elongated grooves are substantially free of two or more intersecting elongated grooves.

8. The method of claim 1 wherein each elongated groove is free of intersection with itself.

9. The method of claim 1 wherein said plurality of elongated grooves reside in a common plane.

10. The method of claim 1 wherein said source of electromagnetic energy is a source of visible light.

11. The method of claim 1 wherein said portion of said surface of said optical element is selected from at least one of a forward surface of said optical element, a side surface of said optical element, and a rear surface of said optical element.

12. The method of claim 1 wherein said optical element comprises an optical substrate having an exterior surface, said exterior surface of said optical substrate defining said portion of said surface of said optical element into which said plurality of elongated grooves are formed.

13. The method of claim 1 wherein said optical element comprises an optical substrate having an exterior surface and a first film having an outer surface over at least a portion of said exterior surface of said optical substrate, said outer surface of said first film defining said portion of said surface of said optical element into which said plurality of elongated grooves are formed.

14. The method of claim 1 wherein said clear film is selected from thermoplastic clear films, crosslinked clear films, and combinations thereof.

15. The method of claim 1 wherein said clear film is formed from a clear coating composition.

16. The method of claim 1 wherein said portion of said surface of said optical element has a first refractive index, and said clear film has a second refractive index, and a difference between said first refractive index and said second refractive index has an absolute value of from 0.01 to 1.2.

17. The method of claim 1 wherein said optical element comprises an optical substrate, said optical substrate comprising an inorganic material, an organic polymeric material, and combinations thereof.

18. The method of claim 1 wherein said optical element is selected from ophthalmic elements, display elements, windows, mirrors, and active liquid crystal cell elements, and passive liquid crystal cell elements.

19. The method of claim 18 wherein said optical element is selected from ophthalmic elements, and said ophthalmic elements are selected from corrective lenses, non-corrective lenses, contact lenses, intra-ocular lenses, magnifying lenses, protective lenses, and visors.

20. The method of claim 18 wherein said optical element is selected from display elements, and said display elements are selected from screens, monitors, and security elements.

21. The method of claim 1 wherein said clear film is selected from single layer clear films and multi-layered clear films, and at least one layer of said clear film includes at least one of a static dye, a photochromic compound, and a photochromic-dichroic compound.

22. An optical element comprising,
(a) a mark residing in a surface of said optical element, wherein at least a portion of said surface of said optical element comprises a plurality of elongated grooves, wherein,
each elongated groove has a longitudinal axis,
each elongated groove is substantially parallel to an adjacent elongated groove,
the longitudinal axis of each elongated groove is aligned substantially parallel with a common longitudinal direction that extends from a center point of said plurality of elongated grooves, and
said plurality of elongated grooves together define said mark; and
(b) a clear film residing over at least said portion of said surface and said plurality of elongated grooves,
further wherein,
said mark is substantially unobservable when a source of electromagnetic energy is viewed through said optical element at a first position that has a first alignment with said center point that is substantially parallel to said common longitudinal direction, and
said mark is substantially observable when said source of electromagnetic energy is viewed through said optical element at a second position that has a second alignment with said center point that is substantially orthogonal to said common longitudinal direction.

* * * * *